United States Patent
Zhou et al.

(10) Patent No.: US 12,212,142 B2
(45) Date of Patent: Jan. 28, 2025

(54) ELECTRICAL ENERGY STORAGE SYSTEM AND ENERGY STORAGE SYSTEM

(71) Applicant: Huawei Digital Power Technologies Co., Ltd., Guangdong (CN)

(72) Inventors: Kui Zhou, Dongguan (CN); Fuwen Chen, Xi'an (CN); Wenke Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/362,728

(22) Filed: Jul. 31, 2023

(65) Prior Publication Data

US 2023/0378757 A1 Nov. 23, 2023

Related U.S. Application Data (63) Continuation of application No. 17/870,790, filed on Jul. 21, 2022, now Pat. No. 11,749,995, which is a continuation of application No. PCT/CN2020/096468, filed on Jun. 17, 2020.

(51) Int. Cl.
*H02J 3/32* (2006.01)
*H02J 3/38* (2006.01)
*H02J 7/00* (2006.01)

(52) U.S. Cl.
CPC .............. *H02J 3/32* (2013.01); *H02J 3/381* (2013.01); *H02J 7/0013* (2013.01); *H02J 2207/20* (2020.01); *H02J 2300/26* (2020.01); *H02J 2300/28* (2020.01)

(58) Field of Classification Search
CPC ...... H02J 3/32; H02J 3/38; H02J 3/381; H02J 7/00; H02J 7/0013; H02J 2300/28; H02J 2207/20; H02J 2300/26
See application file for complete search history.

(56) References Cited

U.S. PATENT DOCUMENTS

2019/0103761 A1* 4/2019 Wyma ................... H02J 9/061

* cited by examiner

*Primary Examiner* — Robert L Deberadinis (57) ABSTRACT

An electrical energy storage system is provided in this disclosure, which includes: M battery packs; M first DC/DC converters, where first terminals of the M first DC/DC converters are respectively connected to the M battery packs, the M first DC/DC converters are classified into N first DC/DC converter sets; and N second DC/DC converters, where the N second DC/DC converters one-to-one correspond to the N first DC/DC converter sets, a first terminal of each second DC/DC converter is connected to second terminals of all first DC/DC converters in a first DC/DC converter set corresponding to the second DC/DC converter, a second terminal of each second DC/DC converter is connected to a first interface of the electrical energy storage system, the first interface is to receive a direct current from a power generation system or output a direct current to the power generation system.

18 Claims, 5 Drawing Sheets

ELECTRICAL ENERGY STORAGE SYSTEM AND ENERGY STORAGE SYSTEM

CROSS-REFERENCE TO RELATED APPLICATIONS

This application is a continuation of U.S. patent application Ser. No. 17/870,790, filed on Jul. 21, 2022, which is a continuation of International Application No. PCT/CN2020/096468, filed on Jun. 17, 2020. All of the afore-mentioned patent applications are hereby incorporated by reference in their entireties.

TECHNICAL FIELD

This disclosure relates to the power supply field, and in particular, to an electrical energy storage system and an energy storage system.

BACKGROUND

An electrical energy storage system may store electrical energy generated by a power generation system in a battery, and obtain electricity from the battery when needed. The power generation system may be a new energy power generation system, for example, a wind power generation system or a photovoltaic power generation system.

The power generation system may output a direct current or an alternating current. The direct current may be supplied to the electrical energy storage system for storage, and the alternating current is used to be supplied to an alternating current power grid or an alternating current load. An alternating current voltage that is output by the power generation system includes different voltage levels. For example, the alternating current voltage levels usually may include single-phase 220 Vac and three-phase 380 Vac. After alternating current to direct current (AC/DC) is performed on alternating current voltages of different levels to obtain direct current voltages, magnitudes of the direct current voltages also vary greatly. For example, the single-phase 220 Vac corresponds to a direct current voltage 311 Vdc, and the three-phase 380 Vac corresponds to a direct current voltage 537 Vdc. Vac represents a maximum magnitude value of an alternating current voltage, and Vdc represents a magnitude of a direct current voltage.

A direct current to direct current (DC/DC) converter in the electrical energy storage system is configured to: receive a direct current that is output by the power generation system, and input the direct current to a battery pack for storage after performing direct current voltage conversion. Therefore, the DC/DC converter needs to be designed, so that an input voltage range of the DC/DC converter adapts to an output voltage range of the power generation system.

In a conventional technology, an input voltage range of a DC/DC converter in an electrical energy storage system is usually designed to match a voltage level of an alternating current of a power generation system. However, in some scenarios, if the alternating current voltage level of the power generation system changes, for example, changes from single-phase 220 Vac to three-phase 380 Vac, the DC/DC converter cannot support an input voltage range corresponding to the three-phase 380 Vac because the input voltage range of the DC/DC converter is designed to support the single-phase 220 Vac. Consequently, the electrical energy storage system cannot support different voltage levels, and application flexibility of the electrical energy storage system is affected.

SUMMARY

This disclosure provides an electrical energy storage system and an energy storage system, to improve application flexibility of the electrical energy storage system.

According to a first aspect, an electrical energy storage system is provided. The system includes: M battery packs; M first direct current to direct current (DC/DC) converters, where first terminals of the M first DC/DC converters are respectively connected to the M battery packs, the M first DC/DC converters are classified into N first DC/DC converter sets, M is an integer greater than 1, and N is an integer greater than 0; and N second DC/DC converters, where the N second DC/DC converters one-to-one correspond to the N first DC/DC converter sets, a first terminal of each second DC/DC converter is connected to second terminals of all first DC/DC converters in a first DC/DC converter set corresponding to the second DC/DC converter, a second terminal of each second DC/DC converter is connected to a first interface of the electrical energy storage system, the first interface is configured to receive a direct current from a power generation system or output a direct current to the power generation system, and N is an integer greater than 1.

In this embodiment of this disclosure, the electrical energy storage system includes two types of DC/DC converters, and the N second DC/DC converters are disposed between the power generation system and the first DC/DC converters. When an output voltage range of the power generation system does not match an input voltage range of the first DC/DC converter and a battery is charged, the second DC/DC converter may be configured to perform voltage conversion on a voltage input by the power generation system, so that an output voltage adapts to the input voltage range of the first DC/DC converter. When the battery is discharged, the second DC/DC converter may perform voltage conversion on a voltage input by the first DC/DC converter, so that a range of voltages output to the power generation system adapts to a voltage level of the power generation system. Therefore, the electrical energy storage system can support different voltage levels of the power generation system, thereby improving application flexibility of the electrical energy storage system.

In this embodiment of this disclosure, because the electrical energy storage system can support different voltage levels of the power generation system, the electrical energy storage system can adapt to inverters of different voltage levels in the power generation system. In other words, in production processes of the electrical energy storage system and the power generation system, because the electrical energy storage system can adapt to power generation systems of different voltage levels, the electrical energy storage system corresponding to the power generation systems of different voltage levels can be produced by using a unified standard, thereby improving the production efficiency.

With reference to the first aspect, in a possible implementation of the first aspect, when $V_{inv}-V_{bus}>V_{th}$ and a battery pack is discharged, the second DC/DC converter is configured to boost $V_{bus}$ to output $V_{inv}$; or when $V_{inv}-V_{bus}>V_{th}$ and a battery pack is charged, the second DC/DC converter is configured to buck $V_{inv}$ to output $V_{bus}$, where $V_{inv}$ represents a rated voltage of the second terminal of the second DC/DC converter, $V_{bus}$ represents a rated voltage of the first terminal of the second DC/DC converter, and $V_{th}$ represents a preset threshold voltage.

With reference to the first aspect, in a possible implementation of the first aspect, when $-V_{th} \leq V_{inv}-V_{bus}<V_{th}$, the second DC/DC converter works in a direct mode, where Vinv represents the rated voltage of the second terminal of the second DC/DC converter, Vbus represents the rated voltage of the first terminal of the second DC/DC converter, and Vth represents the preset threshold voltage.

With reference to the first aspect, in a possible implementation of the first aspect, when Vinv−Vbus<−Vth and the battery pack is discharged, the second DC/DC converter is configured to buck Vbus to output Vinv; or when Vinv−Vbus>Vth and the battery pack is charged, the second DC/DC converter is configured to boost Vinv to output Vbus, where Vinv represents the rated voltage of the second terminal of the second DC/DC converter, Vbus represents the rated voltage of the first terminal of the second DC/DC converter, and Vth represents the preset threshold voltage.

With reference to the first aspect, in a possible implementation of the first aspect, when Vbus>Vbat and the battery pack is discharged, the first DC/DC converter is configured to boost Vbat to output Vbus; or when Vbus>Vbat and the battery pack is charged, the first DC/DC converter is configured to buck Vbus to output Vbat, where Vbus represents the rated voltage of the first terminal of the second DC/DC converter, and Vbat represents a rated voltage of an anode of the battery pack.

With reference to the first aspect, in a possible implementation of the first aspect, when Vbus=Vbat, the first DC/DC converter works in the direct mode, where Vbus represents the rated voltage of the first terminal of the second DC/DC converter, and Vbat represents the rated voltage of the anode of the battery pack.

With reference to the first aspect, in a possible implementation of the first aspect, when Vbus<Vbat and the battery pack is discharged, the first DC/DC converter is configured to buck Vbat to output Vbus; or when Vbus<Vbat and the battery pack is charged, the first DC/DC converter is configured to boost Vbus to output Vbat, where Vbus represents the rated voltage of the first terminal of the second DC/DC converter, and Vbat represents the rated voltage of the anode of the battery pack.

With reference to the first aspect, in a possible implementation of the first aspect, the power generation system includes an inverter, a first terminal of the inverter is connected to the first interface of the electrical energy storage system, and a second terminal of the inverter is connected to an alternating current load or an alternating current power grid.

With reference to the first aspect, in a possible implementation of the first aspect, the power generation system is a photovoltaic power generation system, the power generation system includes a photovoltaic inverter, the photovoltaic inverter includes a maximum power point tracking (MPPT) module and a DC/AC converter, and the inverter is the DC/AC converter; and a first terminal of the DC/AC converter is connected to the first interface of the electrical energy storage system, the first terminal of the DC/AC converter is further connected to the MPPT module, and a second terminal of the DC/AC converter is connected to the alternating current load or the alternating current power grid.

According to a second aspect, an energy storage system is provided. The system includes the electrical energy storage system according to the first aspect and a power generation system.

DESCRIPTION OF EMBODIMENTS

The following describes the technical solutions of this disclosure with reference to the accompanying drawings.

For ease of understanding the solutions of the embodiments of this disclosure, several terms used in the embodiments of this disclosure are first described.

Figure 1:
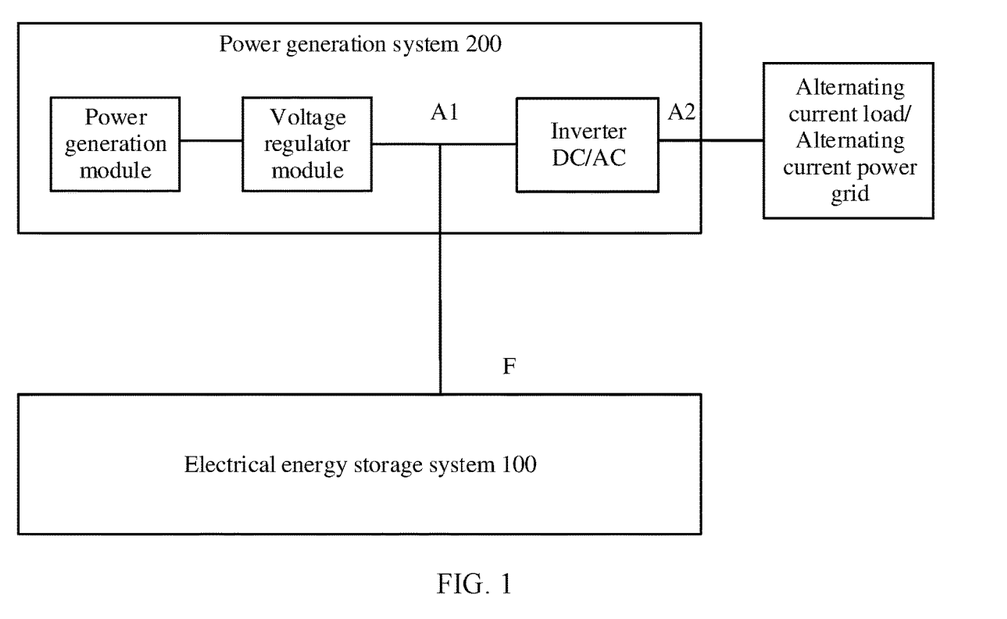
FIG. 1 is a schematic diagram of an application scenario according to an embodiment of this application.

FIG. 1 is a schematic diagram of an application scenario according to an embodiment of this disclosure. As shown in FIG. 1, a power generation system 200 may generate an alternating current or a direct current, and supply the alternating current to an alternating current power grid or an alternating current load. The power generation system 200 may further supply the generated direct current to an electrical energy storage system 100, and the electrical energy storage system 100 stores electrical energy. When power needs to be supplied to the alternating current load, the electrical energy storage system 100 may output a direct current to the power generation system 200. After a direct current to alternating current (DC/AC) converter in the power generation system 200 processes the direct current, an alternating current is obtained and supplied to the alternating current load or the alternating current power grid.

Optionally, the power generation system 200 may be a new energy power generation system, for example, a wind power generation system or a photovoltaic power generation system.

Optionally, the power generation system 200 includes a power generation module, and the power generation module may generate a direct current or an alternating current. For example, a power generation module in a wind power generation system usually generates an alternating current, and a power generation module in a photovoltaic power generation system usually generates a direct current.

Optionally, the power generation system 200 further includes a voltage regulator module, and the voltage regulator module may regulate a voltage output by the power generation module. If a current output by the power generation module is an alternating current, the voltage regulator module is further configured to convert the alternating current into a direct current. For example, a voltage regulator module in a wind power generation system is usually an AC/DC converter, and a voltage regulator module in a photovoltaic power generation system is usually a DC/DC converter. For example, the DC/DC converter may be disposed in a maximum power point tracking (MPPT) module in a photovoltaic inverter (referring to FIG. 2).

Optionally, the power generation system 200 further includes an inverter. The inverter is usually disposed between the voltage regulator module and the alternating current load (or the alternating current power grid), and can implement direct current to alternating current conversion. The inverter may also be referred to as a DC/AC converter.

The inverter includes a first terminal A1 and a second terminal A2. The first terminal A1 is configured to receive a direct current, and the second terminal A2 is connected to the alternating current load or the alternating current power grid. The inverter may implement DC/AC conversion in a direction from the first terminal A1 to the second terminal A2, and supply an obtained alternating current to the alternating current load or the alternating current power grid.

Optionally, the first terminal A1 of the inverter is further connected to a first interface F of the electrical energy storage system 100 to output a direct current to the electrical energy storage system 100.

Optionally, the inverter may alternatively implement AC/DC conversion in a direction from the second terminal A2 to the first terminal A1. For example, when the power generation system 200 is connected to the alternating current power grid, an alternating current input by the alternating current power grid may be converted into a direct current, and the direct current is supplied to the electrical energy storage system 100.

Figure 2:
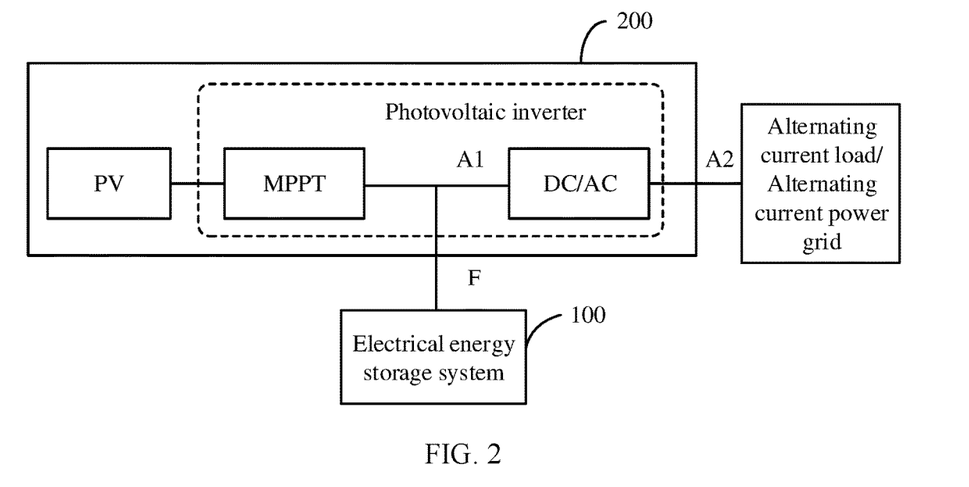
FIG. 2 is a schematic diagram of an application scenario according to an embodiment of this application.

For example, in the photovoltaic power generation system, the inverter may be a DC/AC converter in a photovoltaic inverter (referring to FIG. 2).

FIG. 2 is a schematic diagram of an application scenario according to an embodiment of this disclosure. The scenario in FIG. 2 may be applied to a photovoltaic power generation scenario.

As shown in FIG. 2, the application scenario includes a power generation system 200 and an electrical energy storage system 100. The power generation system 200 includes a photovoltaic (PV) component and a photovoltaic inverter.

The photovoltaic inverter is a special inverter designed for the photovoltaic power generation system. A core of photovoltaic power generation is to convert solar energy into electrical energy by using a photovoltaic component (namely, a solar energy battery panel). However, because the photovoltaic component can generate only a direct current, the photovoltaic inverter needs to convert the direct current into an alternating current to facilitate transmission and use of the electrical energy.

Compared with an ordinary inverter, in addition to a DC/AC converter, the photovoltaic inverter further includes an MPPT module. The MPPT module includes a DC/DC converter. The MPPT module may be configured to track a maximum voltage current value, so that the power generation system 200 outputs a current at a maximum power.

Optionally, the MPPT module and the DC/DC module in the photovoltaic inverter may be disposed in a same encapsulation component, or may be disposed in different encapsulation components.

After performing voltage conversion on a direct current generated by the PV component, the MPPT module may output the direct current to the electrical energy storage system 100. A first terminal A1 of the DC/AC converter may be connected to the MPPT module and the electrical energy storage system 100, and a second terminal A2 of the DC/AC converter is connected to an alternating current power grid or an alternating current load to convert a direct current output by the MPPT module or the electrical energy storage system 100 into an alternating current and supply the alternating current to the alternating current load or the alternating current power grid.

The electrical energy storage system 100 generally includes one or more DC/DC converters, one or more battery packs, and one or more battery management systems (BMSs). Each battery pack corresponds to one BMS. The BMS is usually configured to implement functions such as dynamic monitoring of charging and discharging of a battery, battery balancing, and state of charge evaluation of the battery. A specific structure of the electrical energy storage system 100 continues to be described below with reference to the accompanying drawings.

Figure 3:
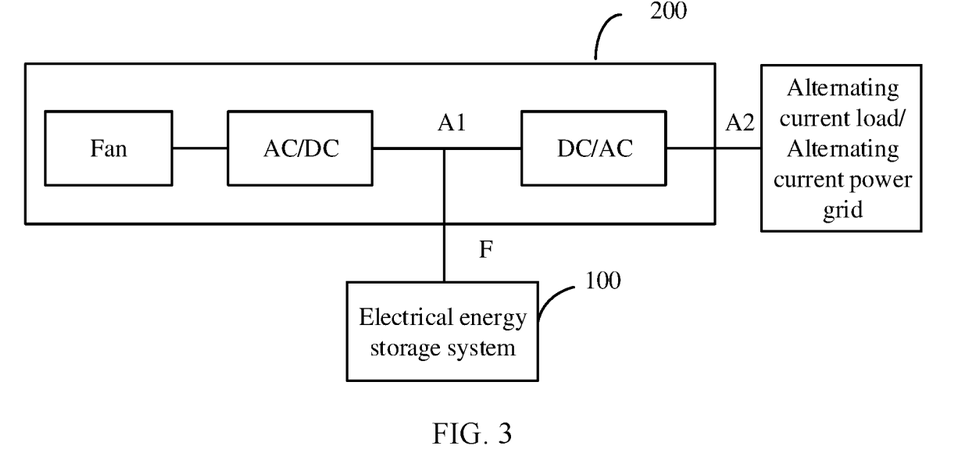
FIG. 3 is a schematic diagram of an application scenario according to an embodiment of this application.

FIG. 3 is a schematic diagram of an application scenario according to another embodiment of this disclosure. The scenario in FIG. 3 may be applied to a wind power generation scenario.

As shown in FIG. 3, the application scenario includes a power generation system 200 and an electrical energy storage system 100. The power generation system 200 includes a fan system, an AC/DC converter, and a DC/AC converter (namely, an inverter).

The fan system is configured to generate an alternating current. The AC/DC converter may be configured to: convert the alternating current generated by the fan system into a direct current, and implement a voltage regulation function. The AC/DC converter may further output the direct current to the electrical energy storage system 100, so that the electrical energy storage system 100 stores the electrical energy. The DC/AC converter may be configured to: receive the direct current output by the AC/DC converter, convert the received direct current into an alternating current, and supply the alternating current to an alternating current load or an alternating current power grid. The DC/AC converter may further be configured to: receive a direct current output by the electrical energy storage system 100, convert the received direct current into an alternating current, and supply the alternating current to the alternating current load or the alternating current power grid.

It should be understood that the scenarios shown in FIG. 1 to FIG. 3 are merely examples, but are not limitations. The electrical energy storage system and the energy storage system in the embodiments of this disclosure may further be applied to an application scenario of another power generation type.

Figure 4:
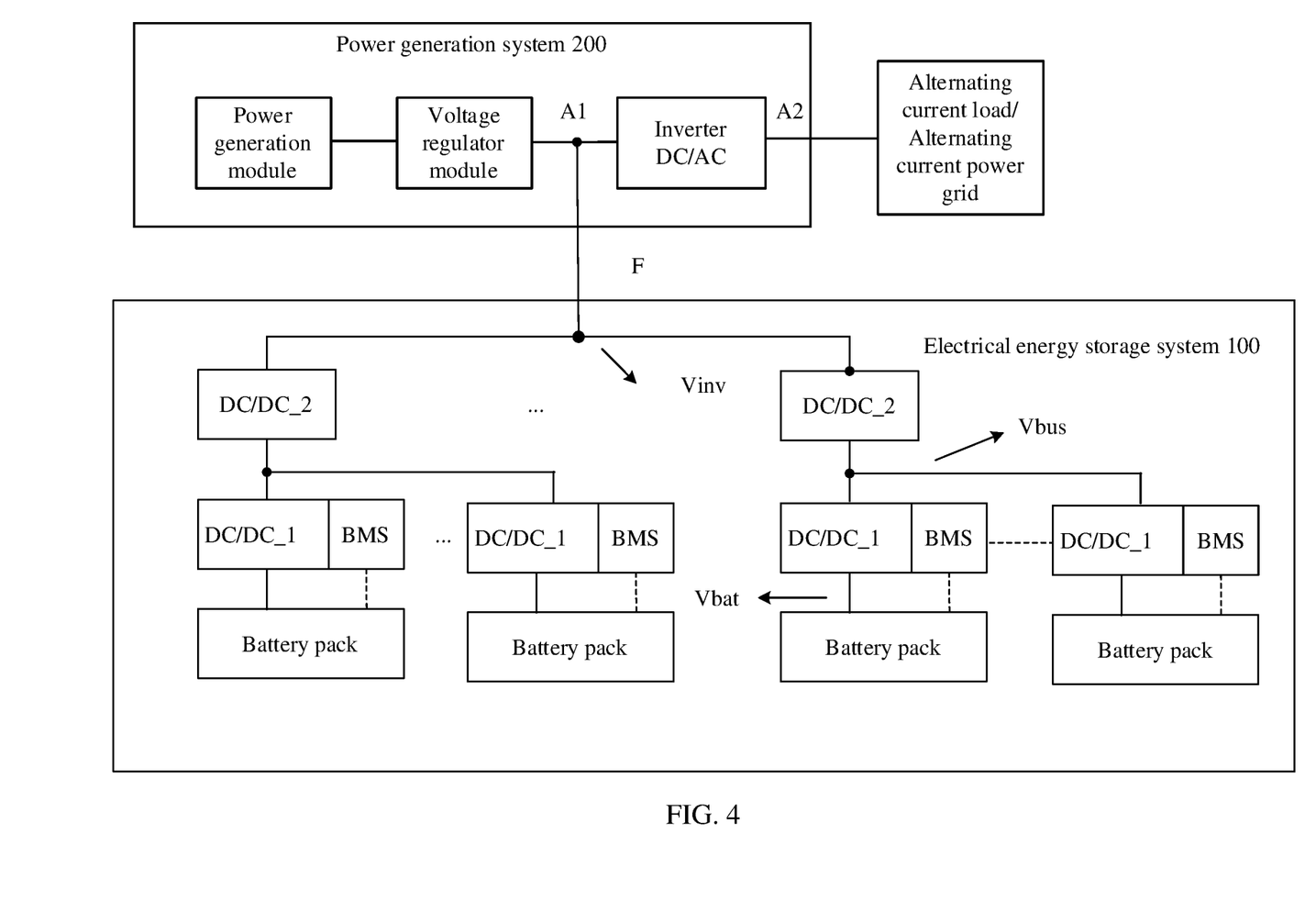
FIG. 4 is a schematic diagram depicting a structure of an energy storage system according to an embodiment of this disclosure.

FIG. 4 is a schematic diagram depicting a structure of an energy storage system according to an embodiment of this disclosure. The energy storage system includes a power generation system 200 and an electrical energy storage system 100.

As shown in FIG. 4, the electrical energy storage system 100 includes: M battery packs, M first DC/DC converters (expressed as DC/DC_1 in the figure), N second DC/DC converters (expressed as DC/DC_2 in the figure), and M BMSs, where M is an integer greater than 1 and N is an integer greater than 0.

The M battery packs one-to-one correspond to the M BMSs. Each BMS is configured to manage a corresponding battery pack, for example, perform functions such as dynamic monitoring of charging and discharging of a battery of the battery pack, battery balancing, and state of charge evaluation of the battery.

The M battery packs one-to-one correspond to the M first DC/DC converters. Each battery pack is connected to a first terminal of a corresponding first DC/DC converter.

The M first DC/DC converters may be classified into N first DC/DC converter sets. The N first DC/DC converter sets one-to-one correspond to the N second DC/DC converters. Each first DC/DC converter set includes one or more first DC/DC converters. Different first DC/DC converter sets may include a same quantity of first DC/DC converters or different quantities of first DC/DC converters.

Correspondingly, the M battery packs are classified into N battery pack sets. The N battery pack sets, the N first DC/DC converter sets, and the N second DC/DC converters are in a one-to-one correspondence mutually.

Optionally, a first terminal of each of the N second DC/DC converters is connected to second terminals of all first DC/DC converters in a first DC/DC converter set corresponding to the second DC/DC converter.

A second terminal of each second DC/DC converter is connected to a first interface F of the electrical energy storage system 100, the first interface F is configured to receive a direct current from the power generation system 200 or output a direct current to the power generation system 200, and N is an integer greater than 1.

Optionally, the first terminal and the second terminal of the first DC/DC converter each include two terminals: a positive terminal and a negative terminal. For example, the positive terminal and the negative terminal of the first terminal of the first DC/DC converter are respectively connected to an anode and a cathode of a battery pack.

Optionally, the first terminal and the second terminal of the second DC/DC converter each include two terminals: a positive terminal and a negative terminal.

In some examples, the first interface F is connected to a first terminal A1 of an inverter in the power generation system 200.

The first DC/DC converter and the second DC/DC converter each can implement a bidirectional boost or buck function. The first DC/DC converter and the second DC/DC converter may further work in a direct mode. In the direct mode, the first DC/DC converter and the second DC/DC converter do not execute a boost/buck function, and are equivalent to one power switch.

Optionally, it may be understood that the N second DC/DC converters are connected in parallel. When one of the N first DC/DC converter sets includes a plurality of first DC/DC converters, the first DC/DC converters in the set are connected in parallel.

Optionally, the first DC/DC converter may use an isolated power conversion manner, or may use a non-isolated power conversion manner.

Optionally, the second DC/DC converter may use an isolated power conversion manner, or may use a non-isolated power conversion manner.

Isolated power conversion means that a transformer is disposed in a DC/DC converter. Non-isolated power conversion means that no transformer is disposed in a DC/DC converter.

Optionally, in this embodiment of this disclosure, battery packs in different battery pack sets may be of a same model, or may be manufactured by different vendors or may be of different models. In other words, the electrical energy storage system in this embodiment of this disclosure may support different types of battery packs.

As shown in FIG. 4, the power generation system 200 includes the inverter (namely, a DC/AC converter), the first terminal A1 of the inverter is connected to the first interface F of the electrical energy storage system 100, and a second terminal A2 of the inverter is connected to an alternating current load or an alternating current power grid. The inverter may output a direct current to the electrical energy storage system 100 through the first interface F of the electrical energy storage system 100.

Optionally, the power generation system 200 may be a new energy power generation system, for example, a wind power generation system or a photovoltaic power generation system.

The power generation system 200 may further be connected to the alternating current power grid. An alternating current supplied by the alternating current power grid may be rectified by using the inverter in the power generation system 200 to obtain a direct current, and the direct current is supplied to the electrical energy storage system 100.

Optionally, the power generation system 200 further includes a power generation module and a voltage regulator module. The power generation module is configured to generate a direct current or an alternating current. The direct current or the alternating current becomes a direct current after passing through the voltage regulator module. The first terminal A1 of the inverter is configured to receive a direct current output by the voltage regulator module. The inverter may implement DC/AC conversion in a direction from the first terminal A1 to the second terminal A2, and supply an obtained alternating current to the alternating current load.

Optionally, the inverter may alternatively implement AC/DC conversion in a direction from the second terminal A2 to the first terminal A1. For example, when the power generation system 200 is connected to the alternating current power grid, an alternating current input by the alternating current power grid may be converted into a direct current, and the direct current is supplied to the electrical energy storage system 100.

Optionally, if the power generation system 200 is a photovoltaic power generation system, the power generation module may include a PV component. In this case, the inverter may be a DC/AC converter in a photovoltaic inverter, and the voltage regulator module is an MPPT module in the photovoltaic inverter.

In this embodiment of this disclosure, the electrical energy storage system includes two types of DC/DC converters, and the N second DC/DC converters are disposed between the power generation system 200 and the first DC/DC converters. When an output voltage range of the power generation system 200 does not match an input voltage range of the first DC/DC converter and a battery is charged, the second DC/DC converter may be configured to perform voltage conversion on a voltage input by the power generation system, so that an output voltage adapts to the input voltage range of the first DC/DC converter. When the battery is discharged, the second DC/DC converter may perform voltage conversion on a voltage input by the first DC/DC converter, so that a range of voltages output to the power generation system adapts to a voltage level of the power generation system. Therefore, the electrical energy storage system can support different voltage levels of the power generation system, thereby improving application flexibility of the electrical energy storage system.

In this embodiment of this disclosure, because the electrical energy storage system can support different voltage levels of the power generation system, the electrical energy storage system can adapt to inverters of different voltage levels in the power generation system. In other words, in production processes of the electrical energy storage system and the power generation system, because the electrical energy storage system can adapt to power generation systems of different voltage levels, the electrical energy storage system corresponding to the power generation systems of different voltage levels can be produced by using a unified standard, thereby improving the production efficiency.

In this embodiment of this disclosure, a manner in which a plurality of battery packs are connected in parallel is used in the electrical energy storage system. Therefore, when a battery pack is invalid, normal work of another battery pack is not affected, thereby improving reliability of the electrical energy storage system.

Figure 5:
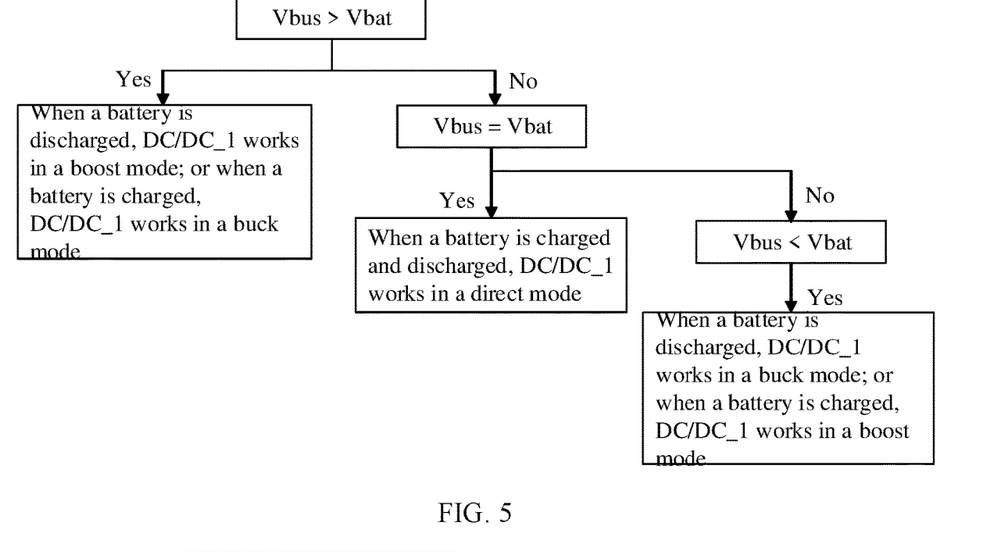
FIG. 5 is a schematic diagram of control logic of an electrical energy storage system 100 according to an embodiment of this disclosure.

FIG. 5 is a schematic diagram of control logic of an electrical energy storage system 100 according to an embodiment of this disclosure. With reference to FIG. 4 and FIG. 5, it is assumed that Vbus represents a rated voltage of a first terminal of any second DC/DC converter (in other words, a rated voltage of a second terminal of a first DC/DC converter), and Vbat represents a rated voltage of a battery pack (in other words, a rated voltage of a first terminal of the first DC/DC converter). The rated voltage may be an optimal voltage at which electrical equipment works normally for a long time. In this case, control logic of the first DC/DC converter is as follows:

When Vbus>Vbat, if the battery pack is discharged, the first DC/DC converter is configured to boost Vbat to output Vbus; or if the battery pack is charged, the first DC/DC converter is configured to buck Vbus to output Vbat.

When Vbus=Vbat, the first DC/DC converter works in a direct mode.

When Vbus<Vbat, if the battery pack is discharged, the first DC/DC converter is configured to buck Vbat to output Vbus; or if the battery pack is charged, the first DC/DC converter is configured to boost Vbus to output Vbat.

In an example, it is assumed that Vbus=350 Vdc and Vbat=48 Vdc. That is, Vbus>Vbat. In this case, when the battery pack is discharged, the first DC/DC converter is configured to boost Vbat to output Vbus; or when the battery pack is charged, the first DC/DC converter is configured to buck Vbus to output Vbat.

Figure 6:
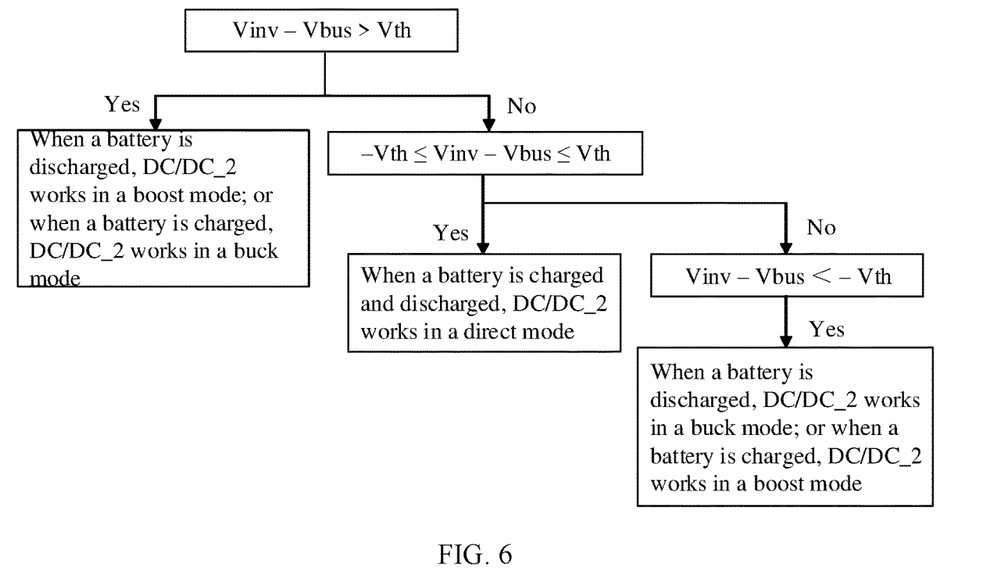
FIG. 6 is a schematic diagram of control logic of an electrical energy storage system 100 according to an embodiment of this disclosure.

FIG. 6 is a schematic diagram of control logic of an electrical energy storage system 100 according to an embodiment of this disclosure. With reference to FIG. 4 and FIG. 6, it is assumed that Vinv represents a rated voltage of a second terminal of any second DC/DC converter (in other words, a rated voltage at a first interface F), Vbus represents a rated voltage of a first terminal of any second DC/DC converter (in other words, a rated voltage of a second terminal of a first DC/DC converter), and Vth represents a preset threshold voltage. In this case, control logic of the second DC/DC converter is as follows:

When Vinv−Vbus>Vth, if a battery pack is discharged, the second DC/DC converter is configured to boost Vbus to output Vinv; or if a battery pack is charged, the second DC/DC converter is configured to buck Vinv to output Vbus.

When −Vth<Vinv−Vbus<Vth, the second DC/DC converter works in a direct mode.

When Vinv−Vbus<−Vth, if a battery pack is discharged, the second DC/DC converter is configured to buck Vbus to output Vinv; or if a battery pack is charged, the second DC/DC converter is configured to boost Vinv to output Vbus.

Optionally, a specific value of Vth may be determined based on practice. For example, the specific value of Vth may be related to an input voltage range of the first DC/DC converter. When Vinv∈[Vbus−Vth, Vbus+Vth], Vinv falls within the input voltage range of the first DC/DC converter. Therefore, the second DC/DC converter works in a direct mode, and Vinv may be directly used as an input voltage of the second DC/DC converter. For example, Vth is 5 V or 10 V.

In an example, it is assumed that Vinv=1000 V, Vbus=350 V, and Vth=10 V. That is, Vinv−Vbus>Vth. When the battery pack is discharged, the second DC/DC converter is configured to boost Vbus to output Vinv; or when the battery pack is charged, the second DC/DC converter is configured to buck Vinv to output Vbus.

Figure 7:
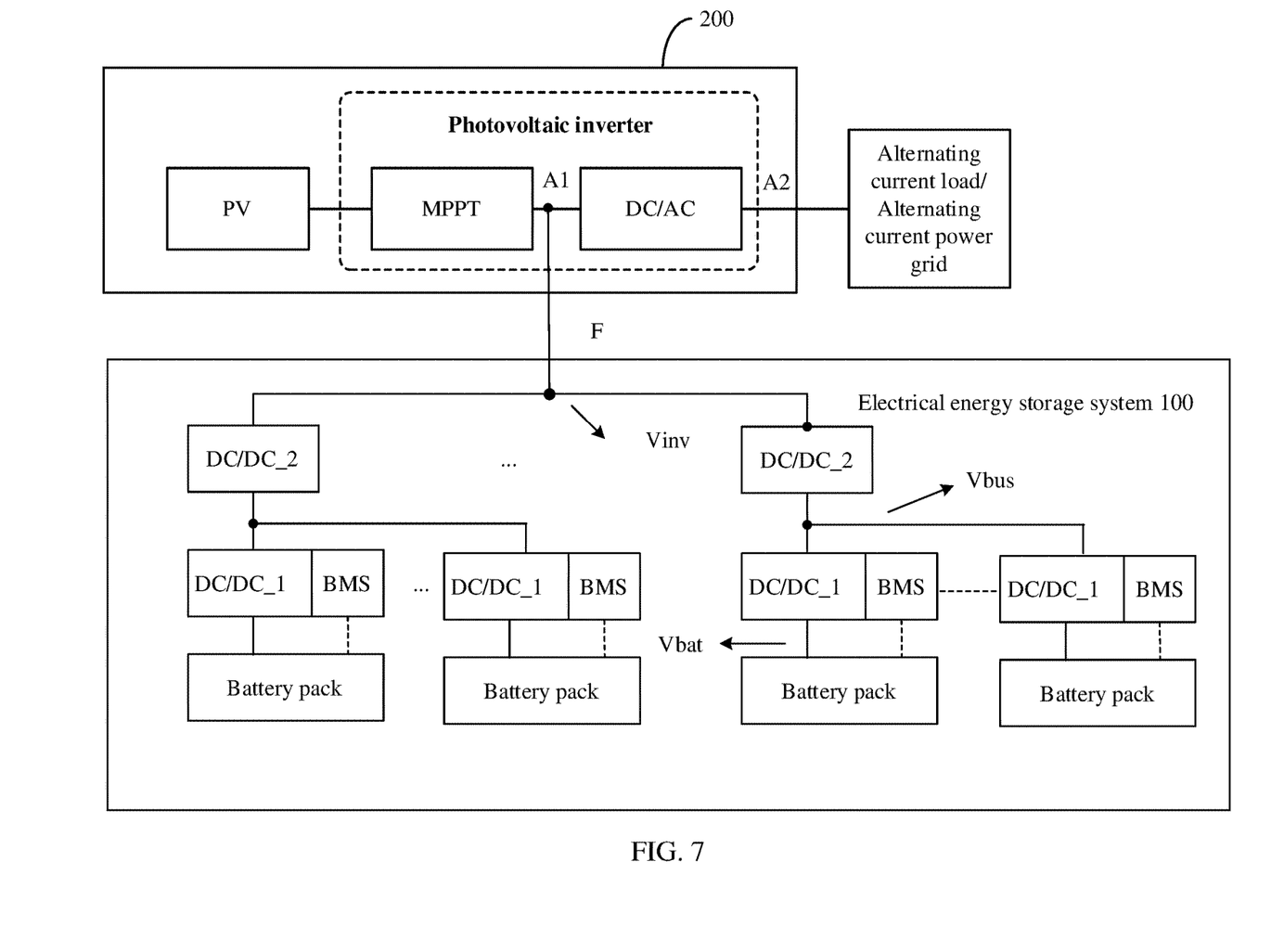
FIG. 7 is a schematic diagram depicting a structure of an energy storage system according to an embodiment of this disclosure.

FIG. 7 is a schematic diagram depicting a structure of an energy storage system according to an embodiment of this disclosure. The energy storage system includes an electrical energy storage system 100 and a power generation system 200. The power generation system 200 in FIG. 7 is a photovoltaic power generation system.

As shown in FIG. 7, the power generation system 200 includes a photovoltaic inverter. The photovoltaic inverter includes an MPPT module and a DC/AC converter. The inverter in FIG. 4 may be the DC/AC converter, and the voltage regulator module may be the MPPT module. A first terminal A1 of the DC/AC converter is connected to a first interface F of the electrical energy storage system 100, and the first terminal A1 of the DC/AC converter is further connected to the MPPT module to receive a direct current from a photovoltaic (PV) component. A second terminal A2 of the DC/AC converter is connected to an alternating current load or an alternating current power grid.

The DC/AC converter may receive a direct current output by the MPPT module, implement DC/AC conversion in a direction from the first terminal A1 to the second terminal A2, and supply an obtained alternating current to the alternating current load.

Optionally, the first terminal A1 of the DC/AC converter is further configured to output a direct current to the electrical energy storage system 100 through the first interface F.

Optionally, the DC/AC converter may alternatively implement AC/DC conversion in a direction from the second terminal A2 to the first terminal A1. For example, when the power generation system 200 is connected to the alternating current power grid, an alternating current input by the alternating current power grid may be converted into a direct current, and the direct current is supplied to the electrical energy storage system 100.

A function of the electrical energy storage system 100 is similar to that in FIG. 4. For brevity, details are not described herein again.

A person of ordinary skill in the art may be aware that units, algorithms, and steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An energy storage system, wherein the system comprises an electrical energy storage system and a power generation system;
   wherein the electrical energy storage system comprises two group of battery packs;
   two group of direct current to direct current (DC/DC) converters, each group comprising a plurality of first (DC/DC converters, wherein first terminals of the first DC/DC converters are respectively connected to the battery packs in the same group; and
   each group comprising of the DC/DC converters further comprising second DC/DC converters, a first terminal of each second DC/DC converter is connected to second terminals of one first DC/DC converter in the same group, a second terminal of each second DC/DC converter is connected to a first interface of the electrical energy storage system, the first interface is configured to receive a direct current from a power generation system or output a direct current to the power generation system;
   wherein one of the first DC/DC converters configured to switch between a boost mode, a buck mode, and a pass-through mode according to a voltage difference between the connected battery pack voltage and a second terminal voltage of the corresponding first DC/DC converter.

2. The energy storage system according to claim 1, wherein
   when Vinv−Vbus>Vth and a battery pack is discharged, the second DC/DC converter is configured to boost Vbus to output Vinv; or
   when Vinv−Vbus>Vth and a battery pack is charged, the second DC/DC converter is configured to buck Vinv to output Vbus, wherein
   Vinv represents a rated voltage of the second terminal of the second DC/DC converter, Vbus represents a rated voltage of the first terminal of the second DC/DC converter, and Vth represents a preset threshold voltage.

3. The energy storage system according to claim 1, wherein when −Vth≤Vinv−Vbus<Vth, the second DC/DC converter works in a direct mode, wherein
   Vinv represents the rated voltage of the second terminal of the second DC/DC converter, Vbus represents the rated voltage of the first terminal of the second DC/DC converter, and Vth represents the preset threshold voltage.

4. The energy storage system according to claim 1, wherein
   when Vinv−Vbus<−Vth and the battery pack is discharged, the second DC/DC converter is configured to buck Vbus to output Vinv; or
   when Vinv−Vbus>Vth and the battery pack is charged, the second DC/DC converter is configured to boost Vinv to output Vbus, wherein
   Vinv represents the rated voltage of the second terminal of the second DC/DC converter, Vbus represents the rated voltage of the first terminal of the second DC/DC converter, and Vth represents the preset threshold voltage.

5. The energy storage system according to claim 1, wherein
   when Vbus>Vbat and the battery pack is discharged, the first DC/DC converter is configured to boost Vbat to output Vbus; or
   when Vbus>Vbat and the battery pack is charged, the first DC/DC converter is configured to buck Vbus to output Vbat, wherein
   Vbus represents the rated voltage of the first terminal of the second DC/DC converter, and Vbat represents a rated voltage of an anode of the battery pack.

6. The energy storage system according to claim 1, wherein when Vbus=Vbat, the first DC/DC converter works in the direct mode, wherein
   Vbus represents the rated voltage of the first terminal of the second DC/DC converter, and Vbat represents the rated voltage of the anode of the battery pack.

7. The energy storage system according to claim 1, wherein
   when Vbus<Vbat and the battery pack is discharged, the first DC/DC converter is configured to buck Vbat to output Vbus; or
   when Vbus<Vbat and the battery pack is charged, the first DC/DC converter is configured to boost Vbus to output Vbat, wherein
   Vbus represents the rated voltage of the first terminal of the second DC/DC converter, and Vbat represents the rated voltage of the anode of the battery pack.

8. The energy storage system according to claim 1, wherein the power generation system comprises an inverter, a first terminal of the inverter is connected to the first interface of the electrical energy storage system, and a second terminal of the inverter is connected to an alternating current load or an alternating current power grid.

9. The energy storage system according to claim 1, wherein the power generation system is a photovoltaic power generation system, the power generation system comprises a photovoltaic inverter, the photovoltaic inverter comprises a maximum power point tracking (MPPT) module and a DC/AC converter, and the inverter is the DC/AC converter; and
   a first terminal of the DC/AC converter is connected to the first interface of the electrical energy storage system, the first terminal of the DC/AC converter is further connected to the MPPT module, and a second terminal of the DC/AC converter is connected to the alternating current load or the alternating current power grid.

10. An electrical energy storage system, comprising:
   two group of battery packs;
   two group of direct current to direct current (DC/DC) converters, each group comprising a plurality of first DC/DC converters and second DC/DC converters, wherein first terminals of the first DC/DC converters are respectively connected to the battery packs in the same group, a first terminal of each second DC/DC converter is connected to second terminals of one first DC/DC converter in the same group, a second terminal of each second DC/DC converter are connected to each other in parallel; and
   wherein one of the first DC/DC converters configured to switch between a boost mode, a buck mode, and a pass-through mode according to a voltage difference between the connected battery pack voltage and a second terminal voltage of the corresponding first DC/DC converter.

11. The system according to claim 10, wherein
   when Vinv−Vbus>Vth and a battery pack is discharged, the second DC/DC converter is configured to boost Vbus to output Vinv; or
   when Vinv−Vbus>Vth and a battery pack is charged, the second DC/DC converter is configured to buck Vinv to output Vbus, wherein
   Vinv represents a rated voltage of the second terminal of the second DC/DC converter, Vbus represents a rated voltage of the first terminal of the second DC/DC converter, and Vth represents a preset threshold voltage.

12. The system according to claim 10, wherein when −Vth≤Vinv−Vbus<Vth, the second DC/DC converter works in a direct mode, wherein
   Vinv represents the rated voltage of the second terminal of the second DC/DC converter, Vbus represents the rated voltage of the first terminal of the second DC/DC converter, and Vth represents the preset threshold voltage.

13. The system according to claim 10, wherein
   when Vinv−Vbus<−Vth and the battery pack is discharged, the second DC/DC converter is configured to buck Vbus to output Vinv; or
   when Vinv−Vbus>Vth and the battery pack is charged, the second DC/DC converter is configured to boost Vinv to output Vbus, wherein
   Vinv represents the rated voltage of the second terminal of the second DC/DC converter, Vbus represents the rated voltage of the first terminal of the second DC/DC converter, and Vth represents the preset threshold voltage.

14. The system according to claim 10, wherein
   when Vbus>Vbat and the battery pack is discharged, the first DC/DC converter is configured to boost Vbat to output Vbus; or
   when Vbus>Vbat and the battery pack is charged, the first DC/DC converter is configured to buck Vbus to output Vbat, wherein
   Vbus represents the rated voltage of the first terminal of the second DC/DC converter, and Vbat represents a rated voltage of an anode of the battery pack.

15. The system according to claim 10, wherein when Vbus=Vbat, the first DC/DC converter works in the direct mode, wherein
   Vbus represents the rated voltage of the first terminal of the second DC/DC converter, and Vbat represents the rated voltage of the anode of the battery pack.

16. The system according to claim 10, wherein
   when Vbus<Vbat and the battery pack is discharged, the first DC/DC converter is configured to buck Vbat to output Vbus; or
   when Vbus<Vbat and the battery pack is charged, the first DC/DC converter is configured to boost Vbus to output Vbat, wherein
   Vbus represents the rated voltage of the first terminal of the second DC/DC converter, and Vbat represents the rated voltage of the anode of the battery pack.

17. The system according to claim 10, wherein the power generation system comprises an inverter, a first terminal of the inverter is connected to the first interface of the electrical energy storage system, and a second terminal of the inverter is connected to an alternating current load or an alternating current power grid.

18. The system according to claim 10, wherein the power generation system is a photovoltaic power generation system, the power generation system comprises a photovoltaic inverter, the photovoltaic inverter comprises a maximum power point tracking (MPPT) module and a DC/AC converter, and the inverter is the DC/AC converter; and
   a first terminal of the DC/AC converter is connected to the first interface of the electrical energy storage system, the first terminal of the DC/AC converter is further connected to the MPPT module, and a second terminal of the DC/AC converter is connected to the alternating current load or the alternating current power grid.

* * * * *